(12) United States Patent
Nagasugi et al.

(10) Patent No.: US 12,278,528 B2
(45) Date of Patent: Apr. 15, 2025

(54) METHOD FOR MANUFACTURING LAMINATED BODY

(71) Applicant: MITSUI HIGH-TEC, INC., Fukuoka (JP)

(72) Inventors: Shigeru Nagasugi, Fukuoka (JP); Takashi Fukumoto, Fukuoka (JP); Jin Oda, Fukuoka (JP)

(73) Assignee: MITSUI HIGH-TEC, INC., Fukuoka (JP)

(*) Notice: Subject to any disclaimer, the term of this patent is extended or adjusted under 35 U.S.C. 154(b) by 964 days.

(21) Appl. No.: 17/048,751

(22) PCT Filed: Apr. 12, 2019

(86) PCT No.: PCT/JP2019/016005
§ 371 (c)(1),
(2) Date: Oct. 19, 2020

(87) PCT Pub. No.: WO2019/220830
PCT Pub. Date: Nov. 21, 2019

(65) Prior Publication Data
US 2021/0194336 A1    Jun. 24, 2021

(30) Foreign Application Priority Data
May 14, 2018    (JP) .................... 2018-093054

(51) Int. Cl.
*H02K 15/02*    (2025.01)
*B32B 15/01*    (2006.01)
(Continued)

(52) U.S. Cl.
CPC ............ *H02K 15/02* (2013.01); *B32B 15/011* (2013.01); *C21D 9/0068* (2013.01); *H01F 41/14* (2013.01);
(Continued)

(58) Field of Classification Search
CPC .... H02K 15/02; H02K 15/022; H02K 15/024; H02K 15/12; H02K 2201/09; C21D 8/12;
(Continued)

(56) References Cited

U.S. PATENT DOCUMENTS

| 2004/0150285 A1 | 8/2004 | Decristofaro et al. |
| 2005/0034295 A1 | 2/2005 | Meacham et al. |

(Continued)

FOREIGN PATENT DOCUMENTS

| CN | 102132366 | 7/2011 |
| CN | 102292178 | 12/2011 |

(Continued)

OTHER PUBLICATIONS

Translation of JP 2001-338825 provided by Search Fit database (Year: 2023).*

(Continued)

*Primary Examiner* — Aneeta Yodichkas
*Assistant Examiner* — Joshua D Anderson
(74) *Attorney, Agent, or Firm* — STERNE, KESSLER, GOLDSTEIN & FOX P.L.L.C.

(57) ABSTRACT

A method for manufacturing a laminated body includes: laminating an electromagnetic steel plate to form the laminated body; performing an annealing process on the laminated body; acquiring a before-annealing lamination thickness information on a thickness of the laminated body before performing the annealing process on the laminated body; and when the before-annealing lamination thickness information does not satisfy a before-annealing criterion which is predetermined, adjusting a lamination condition of the electromagnetic steel plate such that the before-annealing lamination thickness information satisfies the before-annealing criterion.

9 Claims, 10 Drawing Sheets

(51) Int. Cl.
*C21D 9/00* (2006.01)
*H01F 41/14* (2006.01)

(52) U.S. Cl.
CPC ..... *H02K 2201/09* (2013.01); *Y10T 29/49012* (2015.01)

(58) Field of Classification Search
CPC ... C21D 9/0068; B21D 28/02; H01F 41/0233; Y10T 29/49009; Y10T 29/49012; Y10T 29/49078
See application file for complete search history.

(56) References Cited

U.S. PATENT DOCUMENTS

| | | | | |
|---|---|---|---|---|
| 2010/0154968 | A1* | 6/2010 | Shirai | B32B 41/00 156/64 |
| 2011/0284794 | A1 | 11/2011 | Sugiyama et al. | |
| 2012/0205026 | A1* | 8/2012 | Ciampolini | H02K 15/02 156/64 |
| 2013/0000795 | A1 | 1/2013 | Nakanoue | |
| 2013/0167696 | A1* | 7/2013 | Ueno | B21D 43/22 83/91 |
| 2016/0141942 | A1* | 5/2016 | Böker | F16B 11/006 29/596 |
| 2017/0005551 | A1* | 1/2017 | Sasaki | H02K 15/02 |
| 2017/0201163 | A1* | 7/2017 | Chung | B32B 37/0046 |
| 2018/0001369 | A1 | 1/2018 | Senda et al. | |
| 2018/0076700 | A1 | 3/2018 | Nagai et al. | |

FOREIGN PATENT DOCUMENTS

| | | |
|---|---|---|
| CN | 102741957 | 10/2012 |
| JP | 61-214746 A | 9/1986 |
| JP | 62-254646 | 11/1987 |
| JP | 4-276019 A | 10/1992 |
| JP | 2001-98331 | 4/2001 |
| JP | 2001-338825 A | 12/2001 |
| JP | 2003-274616 A | 9/2003 |
| JP | 2013-150457 A | 8/2013 |
| JP | 2015-126623 A | 7/2015 |
| JP | 2016-129902 | 7/2016 |
| WO | 2012/027855 | 3/2012 |

OTHER PUBLICATIONS

Machine Translation of JPs 62-254464 provided by EPO website (Espacenet.com) (Year: 2023).*

Wikipedia, Die freie Enzyklopädie. Bearbeitungsstand: URL: https://de.wikipedia.org/w/index.php?title=GI%C3%BChen&oldid=168343533, Aug. 21, 2017.

International Search Report issued in International Patent Application No. PCT/JP2019/016005, dated Jul. 16, 2019 and English language translation.

Written Opinion issued in International Patent Application No. PCT/JP2019/016005, dated Jul. 16, 2019 and English language translation.

* cited by examiner

METHOD FOR MANUFACTURING LAMINATED BODY

TECHNICAL FIELD

The present disclosure relates to a method for manufacturing a laminated body.

BACKGROUND ART

Patent Literature 1 discloses a method for manufacturing an annealed laminated iron core in which a laminated iron core is formed and annealed so that a lamination thickness of the annealed laminated iron core is not greater than that of the laminated iron core before annealing.

CITATION LIST

Patent Literature

Patent Literature 1: JP2001-338825A

SUMMARY OF INVENTION

Technical Problem

An object of the present disclosure to provide a method for manufacturing a laminated body, which is effective for reducing a defect rate of a thickness after annealing of a laminated body of an electromagnetic steel plate.

Solution to Problem

According to an illustrative aspect of the present disclosure, a method for manufacturing a laminated body includes: laminating an electromagnetic steel plate to form a laminated body; performing an annealing process on the laminated body; acquiring a before-annealing lamination thickness information on a thickness of the laminated body before performing the annealing process on the laminated body; and when the before-annealing lamination thickness information does not satisfy a before-annealing criterion which is predetermined, adjusting a lamination condition of the electromagnetic steel plate such that the before-annealing lamination thickness information satisfies the before-annealing criterion.

Advantageous Effects of Invention

According to the present disclosure, it is possible to provide a method for manufacturing a laminated body, which is effective for reducing a defect rate of a thickness after annealing of a laminated body of an electromagnetic steel plate.

DESCRIPTION OF EMBODIMENTS

Figure 1:
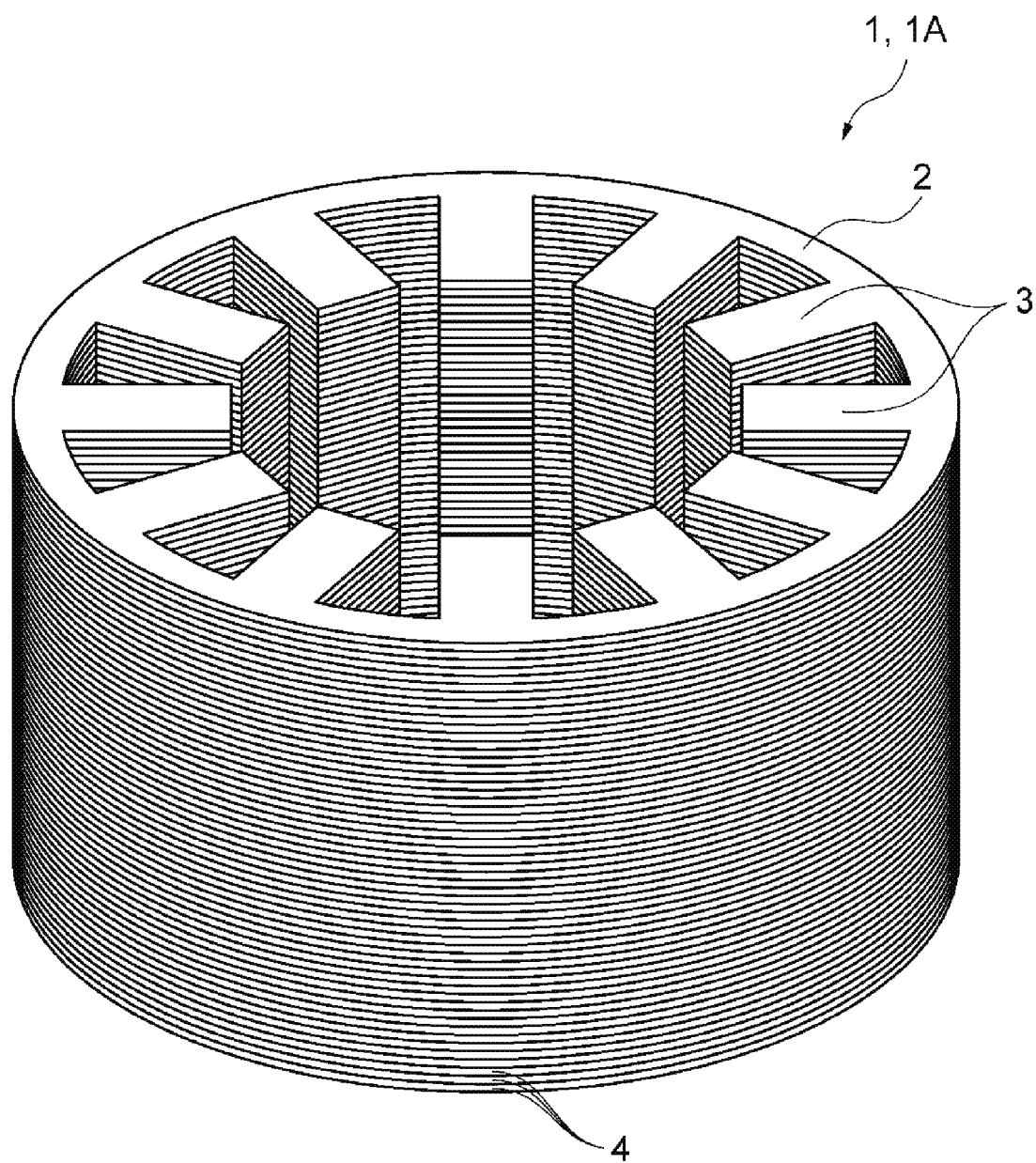
FIG. 1 is a perspective view illustrating a laminated iron core.

Hereinafter, embodiments will be described in detail with reference to the drawings. In the description, the same elements or elements having the same functions are denoted by the same reference numerals, and a repetitive description thereof will be omitted.

[Laminated Body]

A laminated body 1A according to the present embodiment is a laminated iron core 1 for a motor, or is an intermediate product thereof in a manufacturing process. As shown in FIG. 1, the laminated iron core 1 is, for example, a stator core of a motor, and includes an annular yoke 2 and a plurality of teeth 3. The plurality of teeth 3 are arranged at equal intervals along the yoke 2 and protrude from an inner peripheral surface of the yoke 2 toward a center of the yoke 2. The laminated iron core 1 is formed of the laminated body 1A in which a plurality of electromagnetic steel plates 4 perpendicular to a central axis of the yoke 2 are laminated.

Figure 2:
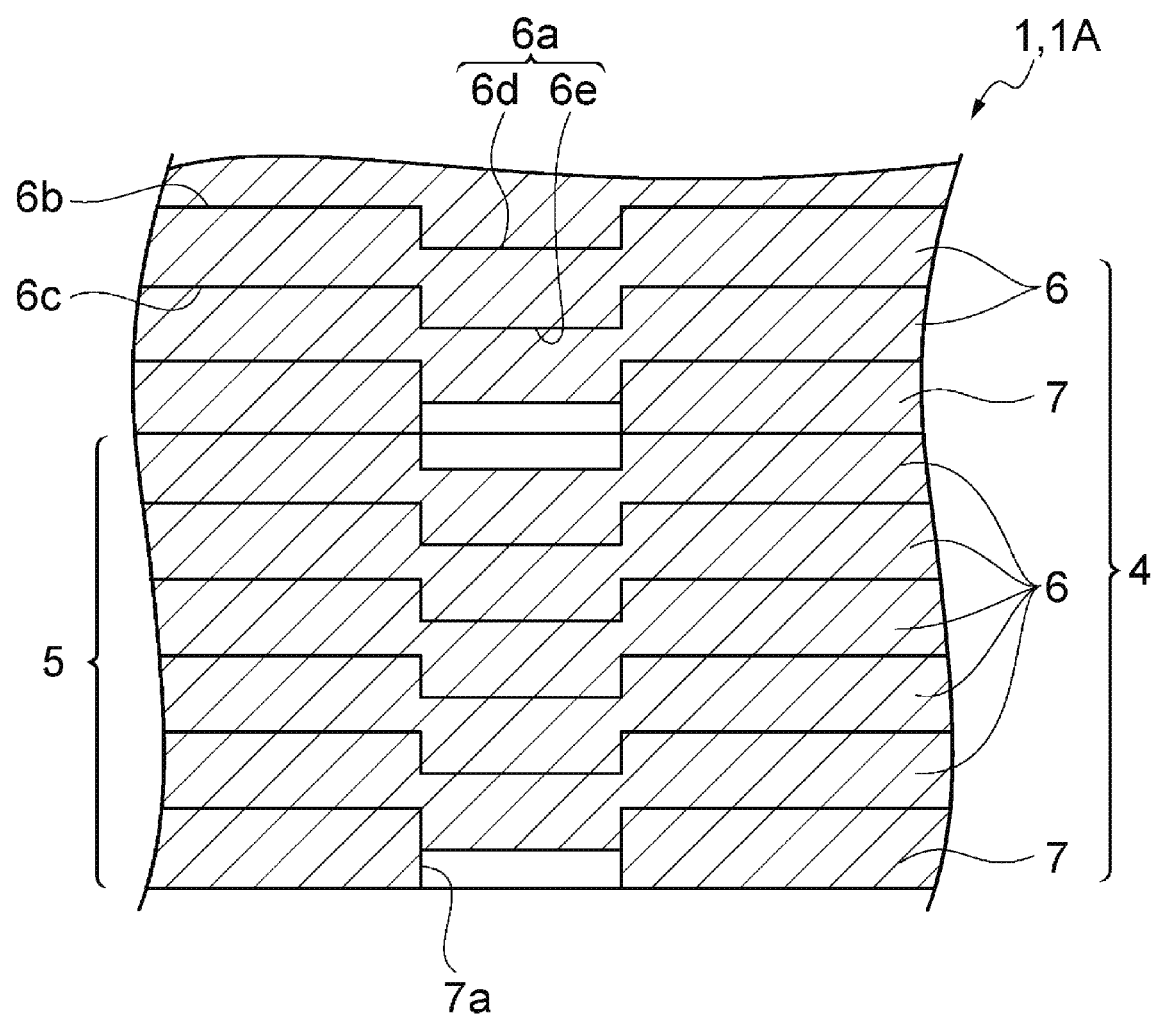
FIG. 2 is a cross-sectional view illustrating a connection portion between electromagnetic steel plates.

As shown in FIG. 2, the laminated body 1A has a plurality of laminated blocks 5 overlapping along the central axis of the yoke 2. Each of the laminated blocks 5 is a laminated body of a plurality of electromagnetic steel plates 4. The plurality of electromagnetic steel plates 4 of the laminated block 5 include a plurality of first electromagnetic steel plates 6 that are laminated on each other, and a second electromagnetic steel plate 7 that is further laminated on the plurality of first electromagnetic steel plates 6. The second electromagnetic steel plate 7 is located at an outermost layer (for example, a lowermost layer as illustrated) of the laminated block 5.

The first electromagnetic steel plate 6 includes a caulking portion 6a. The caulking portion 6a includes a recessed portion 6d formed in a main surface 6b of the first electromagnetic steel plate 6 and a protruding portion 6e formed on a main surface 6c of the first electromagnetic steel plate 6. The first electromagnetic steel plates 6 are laminated such that the main surfaces 6b and 6c face each other. At a boundary between the first electromagnetic steel plates 6, the protruding portion 6e of one of the first electromagnetic steel plates 6 is fitted into the recessed portion 6d of another first electromagnetic steel plate 6. Accordingly, the first electromagnetic steel plates 6 are connected to each other.

The second electromagnetic steel plate 7 is obtained by changing the caulking portion 6a of the first electromagnetic steel plate 6 to a through-hole 7a. The second electromagnetic steel plate 7 is laminated on a main surface 6c side with respect to the first electromagnetic steel plate 6. At a boundary between the first electromagnetic steel plate 6 and the second electromagnetic steel plate 7, the protruding portion 6e of the first electromagnetic steel plate 6 is fitted into the through-hole 7a of the second electromagnetic steel plate 7. Accordingly, the first electromagnetic steel plate 6 and the second electromagnetic steel plate 7 are connected.

The second electromagnetic steel plate 7 prevents the laminated blocks 5 from being connected by the caulking portion 6a. Specifically, the second electromagnetic steel plate 7 prevents fitting of the protruding portion 6e of one laminated block 5 into the recessed portions 6d of another laminated block 5 at a boundary between the laminated blocks 5. The plurality of laminated blocks 5 are fixed to each other by welding, adhesion, or the like. The laminated iron core 1 is not necessarily a stator core, and may be a rotor core.

[Laminated Body Manufacturing Device]

Figure 3:
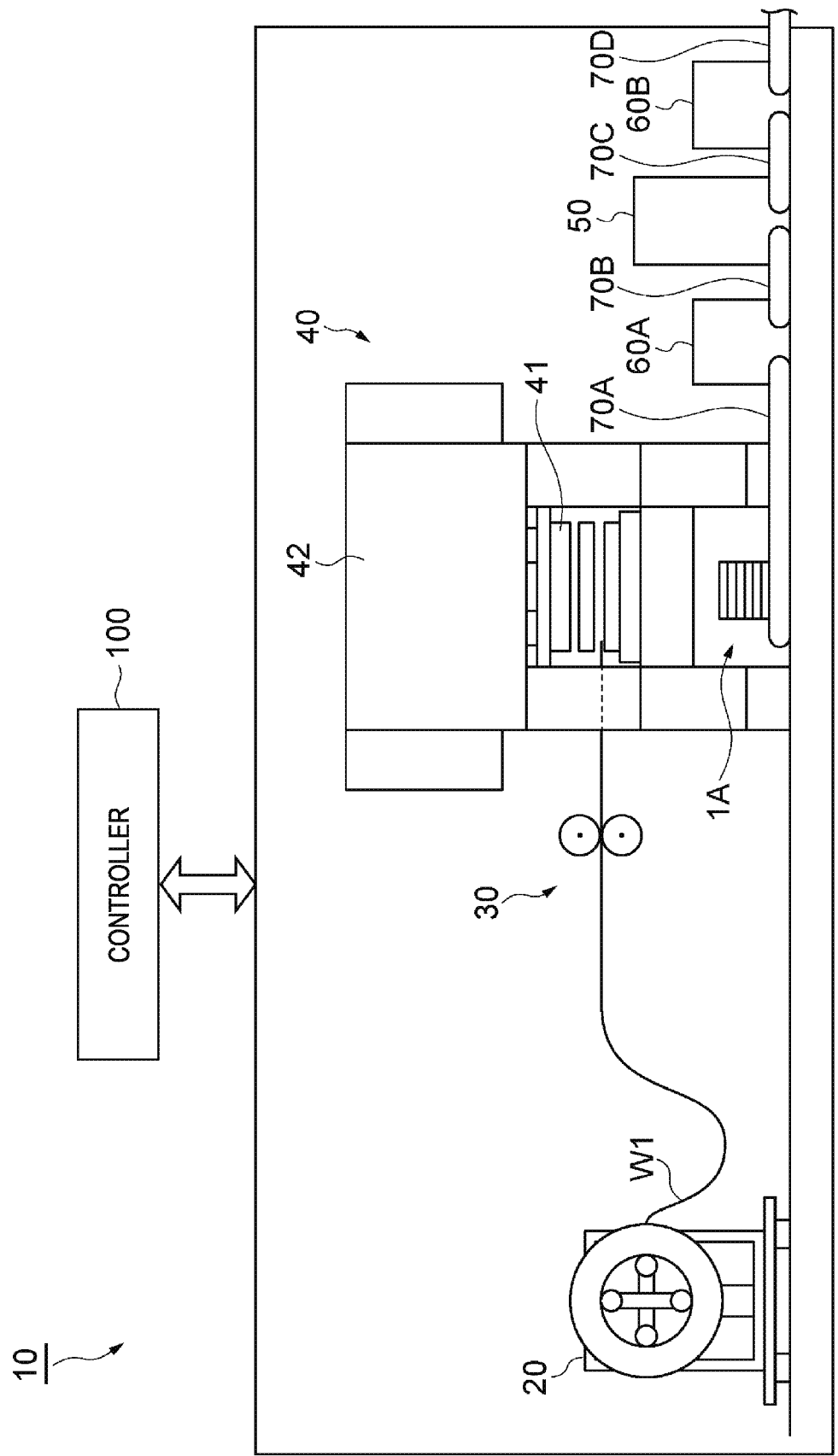
FIG. 3 is a schematic view illustrating a configuration of a laminated body manufacturing device.

Next, a manufacturing device 10 of the laminated body 1A will be described. As shown in FIG. 3, the manufacturing device 10 is a device that manufactures the laminated body 1A from a band-like steel plate W1 that is a band-like electromagnetic steel plate. The manufacturing device 10 includes an uncoiler 20, a delivery device 30, a blanking device 40, an annealing device 50, lamination thickness measurement devices 60A and 60B, conveyors 70A, 70B, 70C, and 70D, and a controller 100.

The uncoiler 20 rotatably holds a wound body in a state where the wound body of the band-like steel plate W1 is mounted. A length of the band-like steel plate W1 constituting the wound body may be, for example, 500 m to 10,000 m. A thickness of the band-like steel plate W1 constituting the wound body may be about 0.1 mm to 0.5 mm. A thickness of the band-like steel plate W1 may be about 0.1 mm to 0.3 mm from the viewpoint of achieving more excellent magnetic characteristics of the laminated iron core 1. A width of the band-like steel plate W1 constituting the wound body may be about 50 mm to 500 mm.

The delivery device 30 sends out the band-like steel plate W1 pulled out from the wound body toward the blanking device 40. The blanking device 40 (laminating device) includes a progressive die 41 and a press part 42. The progressive die 41 is driven by the press part 42 to perform blanking on the band-like steel plate W1. Specifically, with the progressive die 41, a plurality of electromagnetic steel plates 4 obtained by blanking are laminated to form the laminated block 5, and this is repeated to form a plurality of laminated blocks 5, and the plurality of laminated blocks 5 are stacked along a laminating direction of the electromagnetic steel plates 4 to form the laminated body 1A.

The annealing device 50 is a device that performs annealing process on the laminated body 1A formed by the blanking device 40. For example, the annealing device 50 performs the annealing process after the laminated body 1A is put into a heating furnace adjusted to a temperature for annealing. The annealing device 50 may perform the annealing process in a batch system in which a predetermined number of the laminated bodies 1A are collectively processed. For example, the annealing device 50 is configured to carry a predetermined number of laminated bodies 1A into a heating furnace collectively.

The lamination thickness measurement device 60A measures a lamination thickness of the laminated body 1A before the annealing process to be performed by the annealing device 50. The lamination thickness measurement device 60B measures a lamination thickness of the laminated body 1A after the annealing process performed by the annealing device 50.

Figure 4:
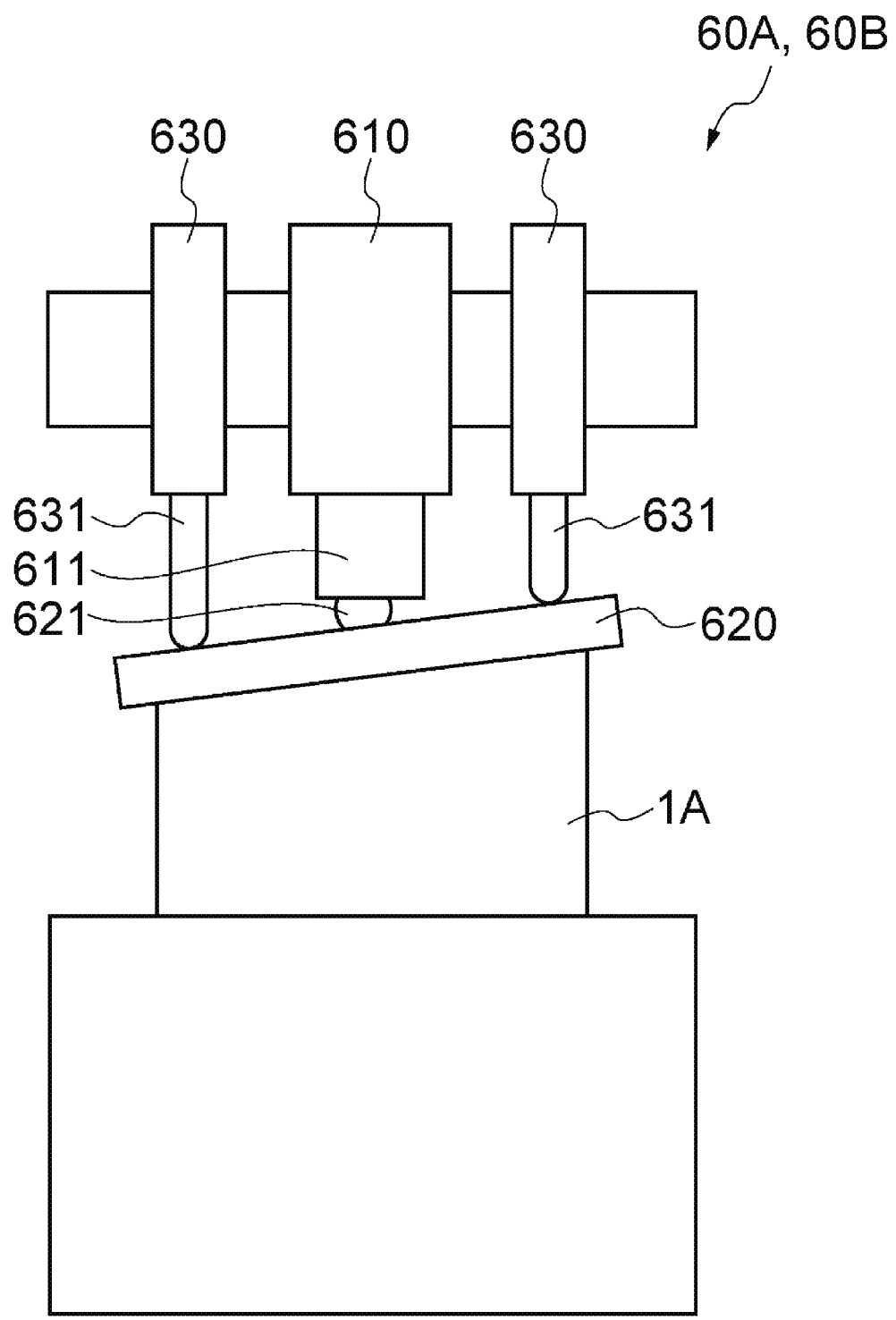
FIG. 4 is a schematic view illustrating a configuration of a lamination thickness measurement device.

As shown in FIG. 4, the lamination thickness measurement devices 60A and 60B each include a pressing plate 620, a depression driving part 610, and a plurality of (for example, three or more) height sensors 630. The pressing plate 620 is disposed on the laminated body 1A to be measured. The depression driving part 610 lowers the pressing plate 620 and presses the pressing plate 620 against the laminated body 1A. The depression driving part 610 is a cylinder of a fluid type such as a hydraulic type or a pneumatic type, and includes a depressing rod 611 protruding downward. A tip end portion of the depressing rod 611 is connected to the pressing plate 620 via a movable joint 621. The movable joint 621 is, for example, a ball joint, and enables tilting of the pressing plate 620 in all directions. With fluid pressure such as hydraulic pressure or pneumatic pressure, the depression driving part 610 lowers the depressing rod 611 to press the pressing plate 620 against the laminated body 1A.

The lamination thickness measurement devices 60A and 60B are configured to be capable of switching between a state where the pressing plate 620 is pressed by the depression driving part 610 (hereinafter, referred to as a "pressed state") and a state where the pressing plate 620 is not pressed by the depression driving part 610 (hereinafter, referred to as a "no-load state"). Therefore, according to the lamination thickness measurement devices 60A and 60B, both information on a thickness of the laminated body 1A in the pressed state (hereinafter, referred to as "thickness in the pressed state") and information on a thickness of the laminated body 1A in the no-load state (hereinafter, referred to as "thickness in the no-load state") can be acquired. A pressing force in the pressed state is set such that a difference in the thickness in the pressed state before and after the annealing process is less than a difference in the thickness in the no-load state before and after the annealing process. The pressing force in the pressed state may be set such that the thickness in the pressed state is substantially the same before and after the annealing process.

The plurality of height sensors 630 are arranged around the central axis of the depressing rod 611, for example. Each height sensor 630, for example, causes a contact rod 631 to protrude downward into contact with the pressing plate 620, and detects a height of an upper surface of the pressing plate 620 based on a protruding length of the contact rod 631. By detecting the height of the upper surface of the pressing plate 620 with each height sensor 630, it is possible to derive a thickness of the laminated body 1A at an arrangement position of each height sensor 630.

Returning to FIG. 3, the conveyor 70A conveys the laminated body 1A from the blanking device 40 to the lamination thickness measurement device 60A. The conveyor 70B conveys the laminated body 1A from the lamination thickness measurement device 60A to the annealing device 50. The conveyor 70C conveys the laminated body 1A from the annealing device 50 to the lamination thickness measurement device 60B. The conveyor 70D further conveys the laminated body 1A from the lamination thickness measurement device 60B to a rear-stage device. Specific examples of the conveyors 70A, 70B, 70C, and 70D include a belt conveyor.

The conveyor 70B may carry out conveyance in two types of conveyance modes: a "normal mode" and a "removal mode". In a case of the normal mode, the conveyor 70B conveys the laminated body 1A from the lamination thickness measurement device 60A to the annealing device 50. In a case of the removal mode, the conveyor 70B removes the laminated body 1A from objects to be conveyed to the annealing device 50. Similarly, the conveyor 70D may carry out conveyance in two types of conveyance modes: the "normal mode" and the "removal mode". In a case of the normal mode, the conveyor 70D conveys the laminated body 1A from the lamination thickness measurement device 60B to a rear-stage device. In a case of the removal mode, the conveyor 70D removes the laminated body 1A from objects to be conveyed to the rear-stage device.

Figure 5:
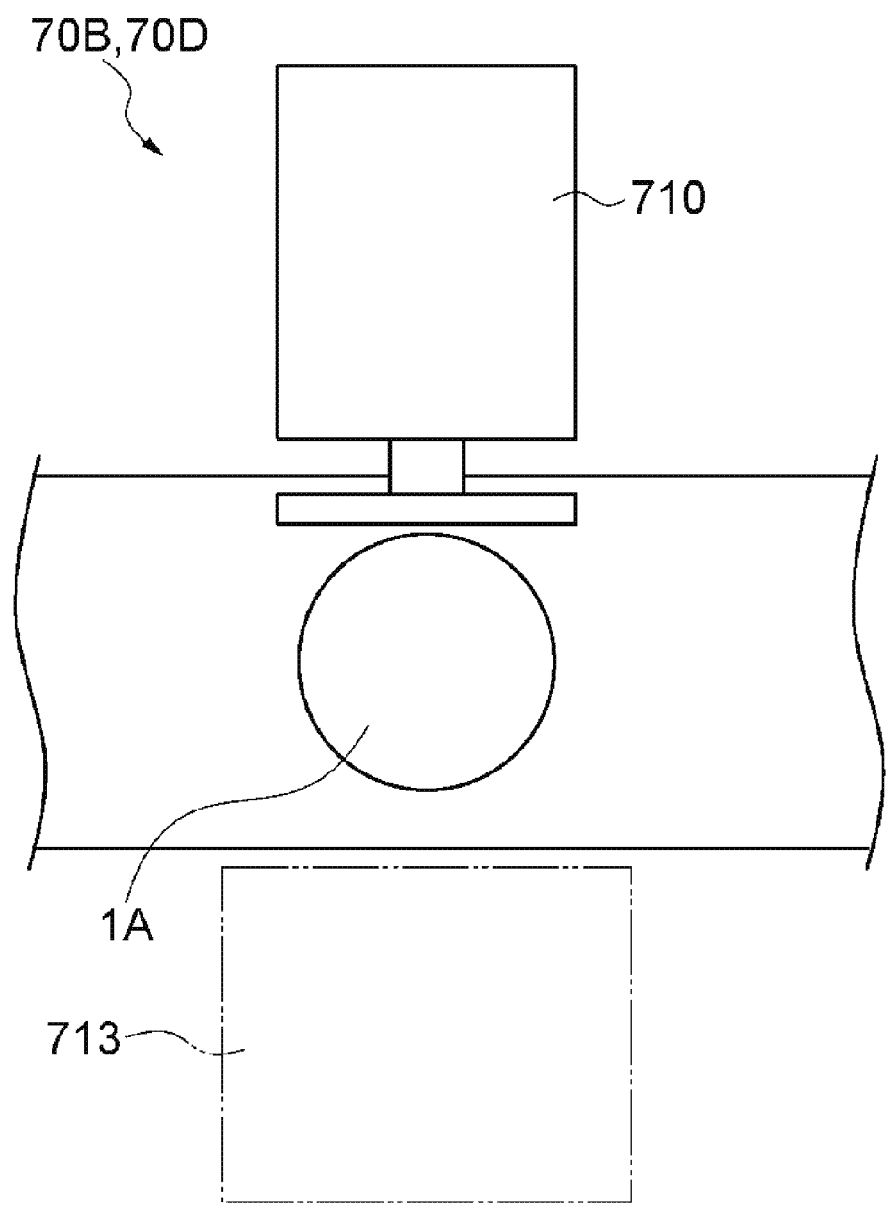
FIG. 5 is a schematic view illustrating a removing device.

For example, as shown in FIG. 5, the conveyors 70B and 70D include a removing device 710. The removing device 710 removes the laminated body 1A to be removed from the conveyors 70B and 70D. For example, the removing device 710 pushes the laminated body 1A to a collection part 713 disposed around the conveyors 70B and 70D, using an electric linear actuator, an air cylinder, or the like as a power source.

Figure 6:
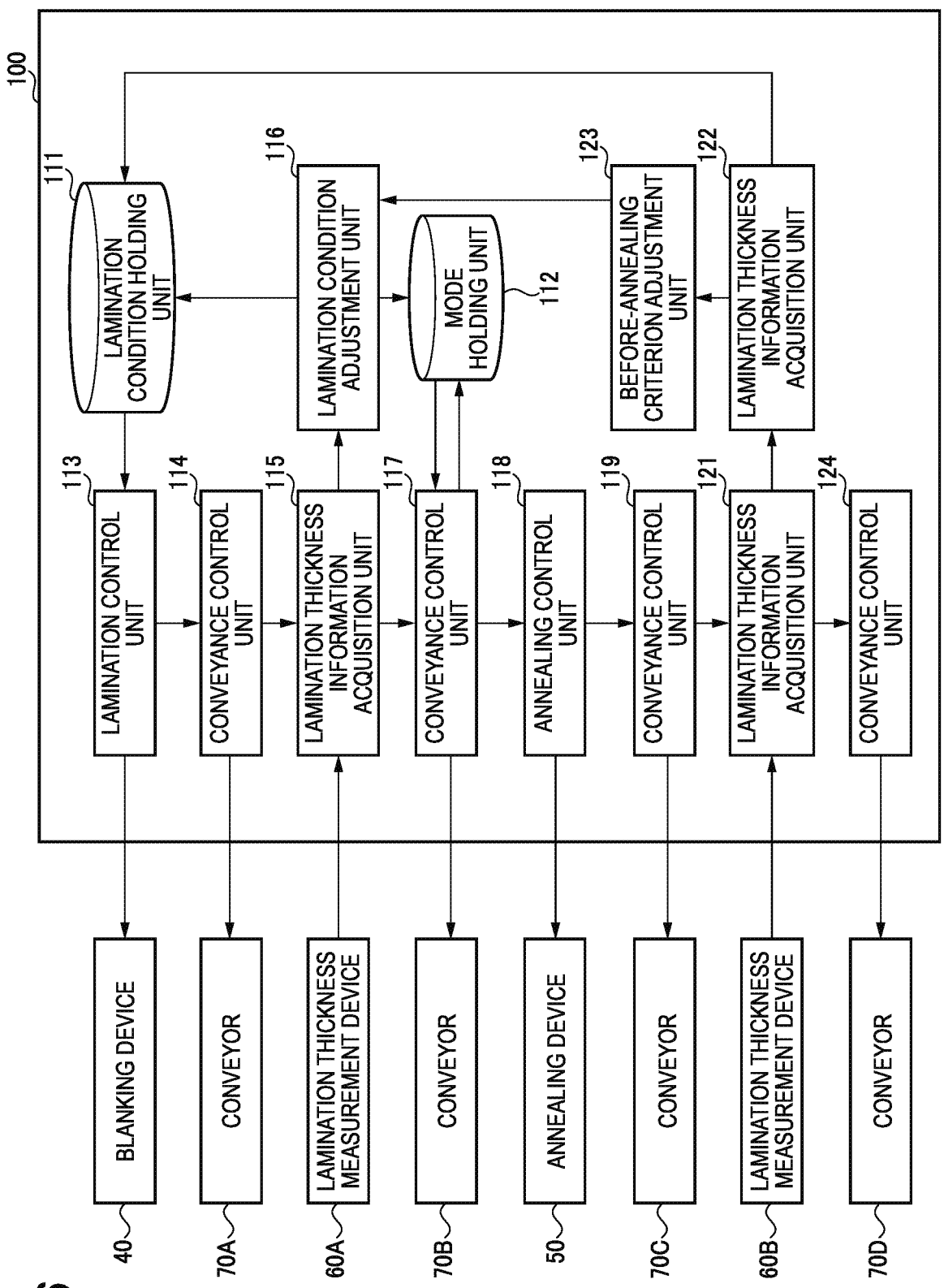
FIG. 6 is a block diagram illustrating a functional configuration of a controller.

Next, a configuration of the controller 100 will be described with reference to FIG. 6. The controller 100 is configured to control the blanking device 40 to laminate the electromagnetic steel plate 4 to form the laminated body 1A, control the annealing device 50 to perform the annealing process on the laminated body 1A, acquire before-annealing lamination thickness information on the thickness of the laminated body 1A from the lamination thickness measurement device 60A before the annealing process is performed on the laminated body 1A, and when the before-annealing lamination thickness information does not satisfy a before-annealing criterion set in advance, adjust a lamination condition for the electromagnetic steel plate 4 so that the before-annealing lamination thickness information satisfies the before-annealing criterion. The information on the thickness of the laminated body 1A includes information directly indicating the thickness of the laminated body 1A and information, a relationship between which and the thickness of the laminated body 1A is specified by a function, a table, or the like.

The controller 100 may further acquire, from the lamination thickness measurement device 60B, after-annealing lamination thickness information on the thickness of the laminated body 1A on which the annealing process is performed, and when the after-annealing lamination thickness information does not satisfy an after-annealing criterion set in advance, adjust the before-annealing criterion so that the after-annealing lamination thickness information satisfies the after-annealing criterion.

The controller 100 may further adjust the lamination condition so that the after-annealing lamination thickness information satisfies the after-annealing criterion, when the before-annealing lamination thickness information of the laminated body 1A satisfies the before-annealing criterion and the after-annealing lamination thickness information of the laminated body 1A does not satisfy the after-annealing criterion.

For example, the controller 100 includes, as functional components (hereinafter referred to as "functional modules"), a lamination condition holding unit 111, a mode holding unit 112, a lamination control unit 113, a conveyance control unit 114, a lamination thickness information acquisition unit 115, a lamination condition adjustment unit 116, a conveyance control unit 117, an annealing control unit 118, a conveyance control unit 119, a lamination thickness acquisition unit 121, a lamination condition adjustment unit 122, a before-annealing criterion adjustment unit 123, and a conveyance control unit 124.

The lamination condition holding unit 111 stores lamination conditions of the first electromagnetic steel plate 6 and the second electromagnetic steel plate 7 for forming the laminated block 5. The lamination condition includes information that affects the lamination thickness of the laminated body 1A, such as a lamination number of the electromagnetic steel plates 4 (a lamination number of the first electromagnetic steel plates 6), a pressing force at the time of laminating the electromagnetic steel plate 4, and a formation condition of the caulking portion 6a. The mode holding unit 112 stores the above-described conveyance modes to be performed by the conveyor 70B.

The lamination control unit 113 controls the blanking device 40 to laminate a plurality of electromagnetic steel plates 4 to form the laminated block 5, and to stack a plurality of laminated blocks 5 in a laminating direction of the electromagnetic steel plates 4 to form one laminated body 1A. At the time of forming the laminated block 5, the lamination control unit 113 controls the blanking device 40 to laminate the electromagnetic steel plates 4 under a lamination condition according to the lamination condition in the lamination condition holding unit 111. More specifically, the lamination control unit 113 controls the blanking device 40 to laminate the first electromagnetic steel plates 6 on one second electromagnetic steel plate 7 under a lamination condition according to the lamination condition of the lamination condition holding unit 111 to form the laminated block 5. The conveyance control unit 114 controls the conveyor 70A to convey the laminated body 1A from the blanking device 40 to the lamination thickness measurement device 60A.

The lamination thickness information acquisition unit 115 acquires the above-described before-annealing lamination thickness information on the laminated body 1A from the lamination thickness measurement device 60A. The before-annealing lamination thickness information may include before-annealing pressed state information indicating the thickness of the laminated body 1A in a state where the laminated body 1A is pressed in the laminating direction of the electromagnetic steel plate 4, and before-annealing no-load state information indicating the thickness of the laminated body 1A in a state where the laminated body 1A is not pressed. That is, the lamination thickness information acquisition unit 115 may acquire information on the thickness in the pressed state and information on the thickness in the no-load state from the lamination thickness measurement device 60A. The information on the thickness in the pressed state is height information detected by the plurality of height sensors 630 in a state where the pressing plate 620 is pressed by the depression driving part 610. The information on the thickness in the no-load state is height information detected by the plurality of height sensors 630 in a state where the pressing plate 620 is not pressed by the depression driving part 610.

When the before-annealing lamination thickness information acquired by the lamination thickness information acquisition unit 115 does not satisfy the before-annealing criterion set in advance, the lamination condition adjustment unit 116 changes the conveyance mode stored in the mode holding unit 112 from the normal mode to the removal mode, and adjusts the lamination condition for the electromagnetic steel plate 4 so that the before-annealing lamination thickness information satisfies the before-annealing criterion. The before-annealing criterion is set in advance based on, for example, a relationship between before-annealing lamination thickness information and after-annealing lamination thickness information acquired in the past. For example, the before-annealing criterion is set so that a defect rate of the after-annealing lamination thickness information of a group of laminated bodies 1A satisfying the criterion is significantly reduced with respect to a defect rate of the after-annealing lamination thickness information of a group of laminated bodies 1A not satisfying the criterion. The before-annealing criterion may include a before-annealing pressed state criterion and a before-annealing no-load criterion which are set in advance.

When it falls within at least one of a case where the before-annealing pressed state information does not satisfy the before-annealing pressed state criterion and a case where the before-annealing no-load state information does not satisfy the before-annealing no-load state criterion, the lamination condition adjustment unit 116 may adjust the lamination condition so that the before-annealing pressed state information and the before-annealing no-load state information satisfy the before-annealing pressed state criterion and the before-annealing no-load state criterion respectively. The before-annealing pressed state criterion may include a before-annealing pressed state lower limit value set in advance, and the before-annealing no-load state criterion may include a before-annealing no-load state upper limit value set in advance. The lamination condition adjustment unit 116 may adjust the lamination condition so as to increase the thickness of the laminated body 1A when the before-annealing pressed state information is lower than the before-annealing pressed state lower limit value, and adjust the lamination condition so as to reduce the thickness of the laminated body 1A when the before-annealing no-load state information is higher than the before-annealing no-load state upper limit value.

The before-annealing pressed state criterion may further include a before-annealing pressed state upper limit value set in advance. The lamination condition adjustment unit 116 may adjust the lamination condition so as to reduce the thickness of the laminated body 1A even when the before-annealing pressed state information is higher than the before-annealing pressed state upper limit value. The lamination condition adjustment unit 116 may not necessarily perform adjustment of the lamination condition which is in accordance with whether or not the before-annealing pressed state information is higher than the before-annealing pressed state upper limit value. In addition, the lamination condition adjustment unit 116 may not perform adjustment of the lamination condition which is in accordance with whether or not the before-annealing no-load state information is lower than the predetermined lower limit value.

After adjusting the lamination condition, the lamination condition adjustment unit 116 maintains the conveyance mode of the conveyor 70B in the removal mode without further adjusting the lamination condition until the laminated body 1A formed after the adjustment is conveyed to the lamination thickness measurement device 60A. When the laminated body 1A formed after the adjustment of the lamination condition is conveyed to the lamination thickness measurement device 60A and the before-annealing lamination thickness information of the laminated body 1A satisfies the before-annealing criterion, the lamination condition adjustment unit 116 changes the conveyance mode of the conveyor 70B from the removal mode back to the normal mode. When the before-annealing lamination thickness information of the laminated body 1A does not satisfy the before-annealing criterion, the lamination condition adjustment unit 116 adjusts the lamination condition again while maintaining the conveyance mode of the conveyor 70B in the removal mode. Therefore, the conveyance mode of the conveyor 70B is maintained in the removal mode after it is determined that the before-annealing lamination thickness information does not satisfy the before-annealing criterion, until the before-annealing lamination thickness information satisfies the before-annealing criterion.

The conveyance control unit 117 controls the conveyor 70B to convey the laminated body 1A from the lamination thickness measurement device 60A to the annealing device 50 (hereinafter, the control is referred to as "normal conveyance control"). Further, when the before-annealing lamination thickness information of a laminated body 1A does not satisfy the before-annealing criterion, the conveyance control unit 117 controls the conveyor 70B to remove laminated bodies 1A formed following the laminated body 1A using the removing device 710 until the before-annealing lamination thickness information satisfies the before-annealing criterion (hereinafter, the control is referred to as "removal control"). For example, the conveyance control unit 117 executes the normal conveyance control when the conveyance mode of the conveyor 70B is the normal mode, and executes the removal control when the conveyance mode of the conveyor 70B is the removal mode. As described above, the conveyance mode of the conveyor 70B is maintained in the removal mode after it is determined that the before-annealing lamination thickness information does not satisfy the before-annealing criterion, until the before-annealing lamination thickness information satisfies the before-annealing criterion. Therefore, if the removal control is executed when the conveyance mode of the conveyor 70B is the removal mode, the removal control is continued until the before-annealing lamination thickness information satisfies the before-annealing criterion.

The annealing control unit 118 controls the annealing device 50 to perform annealing process on the laminated body 1A. For example, the annealing control unit 118 controls the annealing device 50 to, at a timing when a predetermined number of laminated bodies 1A are conveyed from the lamination thickness measurement device 60A to the annealing device, carries the laminated bodies collectively into an annealing furnace and then carries the laminated bodies out of the annealing furnace after elapse of a predetermined time period. The conveyance control unit 119 controls the conveyor 70C to convey the laminated body 1A from the annealing device 50 to the lamination thickness measurement device 60B.

The lamination thickness information acquisition unit 121 acquires the after-annealing lamination thickness information of the laminated body 1A from the lamination thickness measurement device 60B. The after-annealing lamination thickness information may include after-annealing pressed state information indicating the thickness of the laminated body 1A in a state where the laminated body 1A is pressed in the laminating direction of the electromagnetic steel plate 4, and after-annealing no-load state information indicating the thickness of the laminated body 1A in a state where the laminated body 1A is not pressed. That is, the lamination thickness information acquisition unit 121 may acquire information on the thickness in the pressed state and information on the thickness in the no-load state from the lamination thickness measurement device 60B.

The lamination condition adjustment unit 122 adjusts the lamination condition so that the after-annealing lamination thickness information satisfies the after-annealing criterion, when the before-annealing lamination thickness information of the laminated body 1A satisfies the before-annealing criterion and the after-annealing lamination thickness information of the laminated body 1A does not satisfy the after-annealing criterion. As described above, when the before-annealing lamination thickness information of a laminated body 1A does not satisfy the before-annealing criterion, the conveyance mode of the conveyor 70B is maintained in the removal mode, and the laminated body 1A is removed by the removing device 710. Therefore, the laminated body 1A is not subjected to the processing to be executed by the lamination thickness information acquisition unit 121 and the lamination condition adjustment unit 122. In other words, acquisition of the after-annealing lamination thickness information of the laminated body 1A, and adjustment of the lamination number of the laminated electromagnetic steel plates 4 which is in accordance with the acquisition are executed when the before-annealing lamination thickness information satisfies the before-annealing criterion.

The lamination condition adjustment unit 122 may perform adjustment of the lamination condition which is in accordance with whether or not the after-annealing no-load state information satisfies a predetermined criterion, without performing adjustment of the lamination condition which is in accordance with whether or not the after-annealing pressed state information satisfies a predetermined criterion. The lamination condition adjustment unit 122 may perform adjustment of the lamination condition which is in accordance with whether or not the after-annealing no-load state information of the laminated body 1A is higher than a predetermined upper limit value, without performing adjustment of the lamination condition which is in accordance with whether or not the after-annealing no-load state information of the laminated body 1A is lower than a predetermined lower limit value. For example, the after-annealing criterion includes an after-annealing no-load state upper limit value set in advance. The lamination condition adjustment unit 122 adjusts the lamination condition to reduce the thickness of the laminated body 1A, when the before-annealing no-load state information of the laminated body 1A is equal to or lower than the before-annealing no-load state upper limit value and the after-annealing no-load state information of the laminated body 1A is higher than the after-annealing no-load state upper limit value. The after-annealing no-load state upper limit value may be set to a value smaller than the before-annealing no-load state upper limit value.

The lamination condition adjustment unit 122 may adjust the lamination condition when the defect rate of the after-annealing lamination thickness information in a plurality of laminated bodies 1A subjected to the annealing process collectively in the annealing device 50 exceeds a predetermined threshold. The defect rate in this case is a ratio of the number of laminated bodies 1A, whose after-annealing lamination thickness information does not satisfy the after-annealing criterion, to a total number of the laminated bodies 1A subjected to the annealing process collectively in the annealing device 50.

When the after-annealing lamination thickness information does not satisfy the after-annealing criterion, the before-annealing criterion adjustment unit 123 adjusts the before-annealing criterion so that the after-annealing lamination thickness information satisfies the after-annealing criterion. In a case there the after-annealing no-load state information is higher than the after-annealing no-load state upper limit value, the before-annealing criterion adjustment unit 123 may reduce the before-annealing no-load state upper limit value.

When the after-annealing lamination thickness information of the laminated body 1A satisfies the after-annealing criterion, the conveyance control unit 124 controls the conveyor 70D to convey the laminated body 1A from the lamination thickness measurement device 60B to a rear-stage device. On the other hand, when the after-annealing lamination thickness information of the laminated body 1A does not satisfy the after-annealing criterion, the conveyance control unit 124 controls the conveyor 70D to remove the laminated body 1A using the removing device 710.

Figure 7:
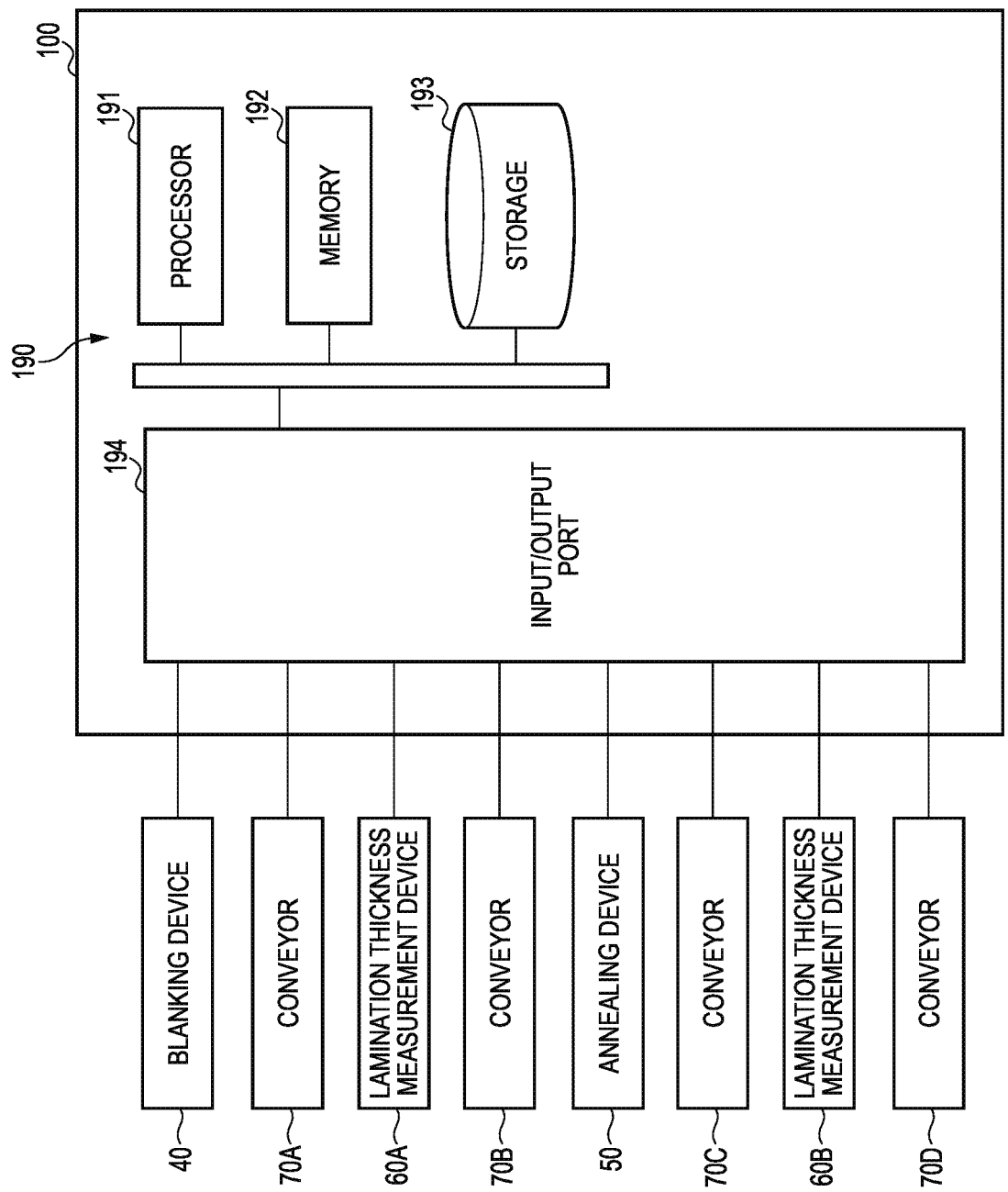
FIG. 7 is a block diagram illustrating a hardware configuration of a controller.

The controller 100 is configured with one or more control computers. For example, the controller 100 includes a circuit 190 shown in FIG. 7. The circuit 190 includes one or more processors 191, a memory 192, a storage 193, and an input/output port 194. The storage 193 includes a computer-readable storage medium such as a hard disk. The storage medium stores a program for causing the manufacturing device 10 to execute a manufacturing procedure for the laminated body 1A, which is to be described later. The storage medium may be a removable medium such as a nonvolatile semiconductor memory, a magnetic disk, and an optical disk. The memory 192 temporarily stores a program loaded from the storage medium of the storage 193 and a calculation result by the processor 191. The processor 191 constitutes each of the functional modules described above by executing the program in cooperation with the memory 192. The input/output port 194 performs input and output of electric signals between the blanking device 40, the annealing device 50, the lamination thickness measurement devices 60A and 60B, and the conveyors 70A, 70B, 70C, and 70D in accordance with a command from the processor 191. Note that a hardware configuration of the controller 100 is not necessarily limited to one in which each functional module is configured with a program. For example, each functional module of the controller 100 may be configured with a dedicated logic circuit or an application specific integrated circuit (ASIC) in which dedicated logic circuits are integrated.

[Laminated Body Manufacturing Procedure]

Next, a manufacturing procedure for the laminated body 1A to be executed by the manufacturing device 10 will be described as an example of a method for manufacturing a laminated body. This manufacturing procedure includes laminating the electromagnetic steel plates 4 to form the laminated body 1A, performing the annealing process on the laminated body 1A, acquiring the before-annealing lamination thickness information on the thickness of the laminated body 1A before performing the annealing process on the laminated body 1A, and when the before-annealing lamination thickness information does not satisfy the before-annealing criterion set in advance, adjusting the lamination condition for the electromagnetic steel plate 4 so that the before-annealing lamination thickness information satisfies the before-annealing criterion.

This manufacturing procedure may further include acquiring the after-annealing lamination thickness information on the thickness of the laminated body 1A after the annealing process is performed on the laminated body 1A, and when the after-annealing lamination thickness information does not satisfy the after-annealing criterion set in advance, adjusting the before-annealing criterion so that the after-annealing lamination thickness information satisfies the after-annealing criterion. This manufacturing procedure may further include adjusting the lamination condition, when the before-annealing lamination thickness information of the laminated body 1A satisfies the before-annealing criterion and the after-annealing lamination thickness information of the laminated body 1A does not satisfy the after-annealing criterion, so that the after-annealing lamination thickness information satisfies the after-annealing criterion. Hereinafter, the manufacturing procedure for the laminated body 1A is divided into a lamination procedure, a before-annealing lamination thickness check procedure, and an annealing and after-annealing lamination thickness check procedure, and each procedure is illustrated in detail.

(Lamination Procedure)

The lamination procedure is a procedure of laminating a plurality of electromagnetic steel plates 4 to form the laminated block 5 and stacking a plurality of laminated blocks 5 along the laminating direction of the electromagnetic steel plates 4 to form one laminated body 1A.

Figure 8:
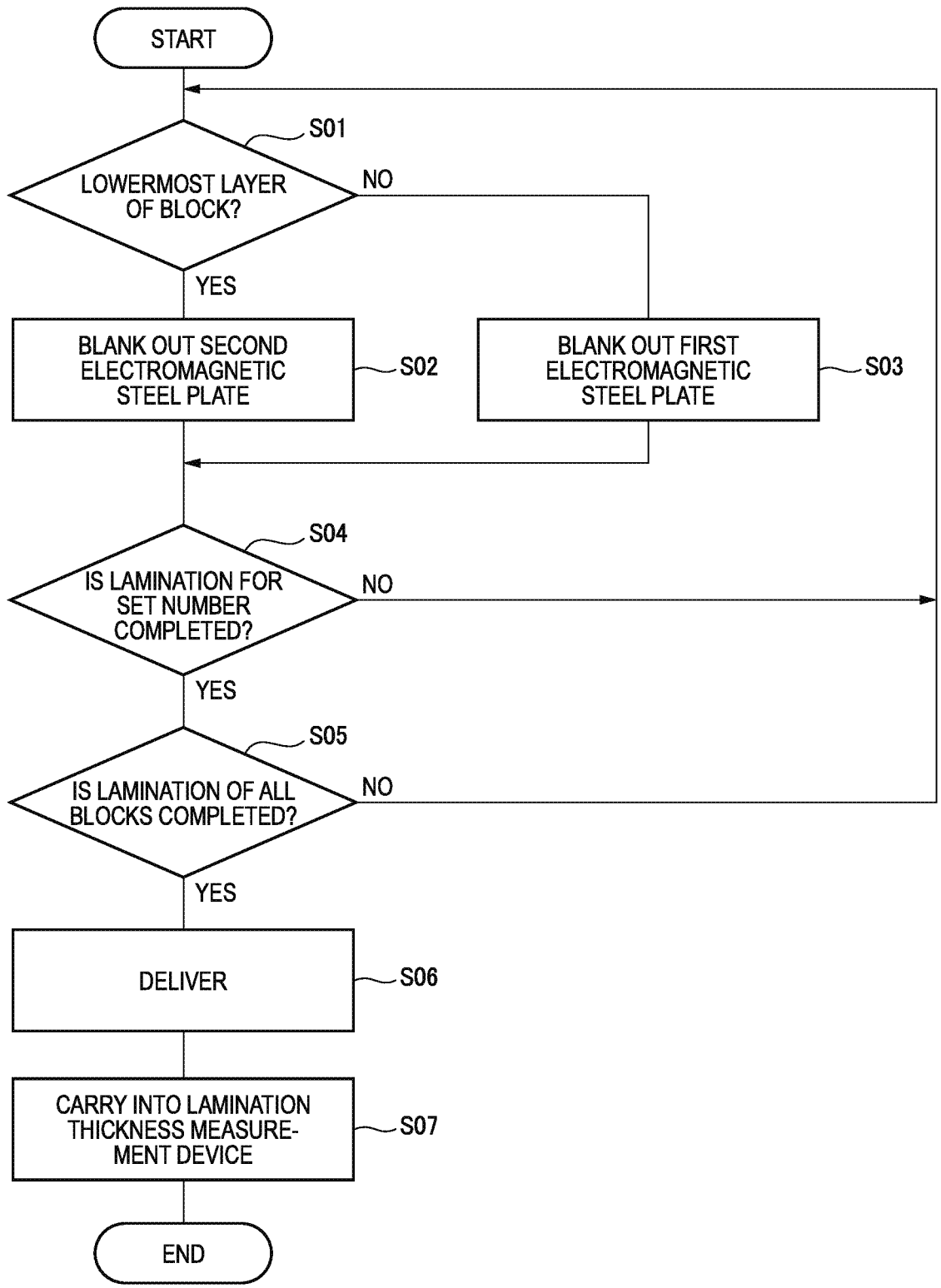
FIG. 8 is a flowchart illustrating a lamination procedure.

For example, as shown in FIG. 8, the controller 100 executes step S01. In step S01, the lamination control unit 113 checks whether or not an electromagnetic steel plate 4 (hereinafter, referred to as an "electromagnetic steel plate 4 to be blanked out") to be blanked out from the band-like steel plate W1 by the blanking device 40 is a lowermost layer of the laminated block 5.

If it is determined in step S01 that the electromagnetic steel plate 4 to be blanked out is a lowermost layer of the laminated block 5, the controller 100 executes step S02. In step S02, the lamination control unit 113 controls the blanking device 40 to blank out the second electromagnetic steel plate 7 from the band-like steel plate W1.

If it is determined in step S01 that the electromagnetic steel plate 4 to be blanked out is not a lowermost layer of the laminated block 5, the controller 100 executes step S03. In step S03, the lamination control unit 113 controls the blanking device 40 to blank out the first electromagnetic steel plate 6 from the band-like steel plate W1, and to laminate the first electromagnetic steel plate 6 on the electromagnetic steel plate 4 previously blanked out.

After executing step S02 or step S03, the controller 100 executes step S04. In step S04, the lamination control unit 113 checks whether or not lamination of the electromagnetic steel plate 4 for a lamination number (hereinafter, referred to as a "set number") included in the lamination condition stored in the lamination condition holding unit 111 is completed. If it is determined in step S04 that the lamination of the set number of electromagnetic steel plates 4 has not been completed, the controller 100 returns the processing to step S01. Thereafter, the controller 100 repeats procedures of steps S01 to S04 until the lamination of the set number of electromagnetic steel plates 4 is completed.

If it is determined in step S04 that the lamination of the set number of electromagnetic steel plates 4 is completed, the controller 100 executes step S05. In step S05, the lamination control unit 113 checks whether or not lamination of all the laminated blocks 5 is completed. If it is determined in step S05 that the lamination of all the laminated blocks 5 has not been completed, the controller 100 returns the processing to step S01. Thereafter, the controller 100 repeats procedures of steps S01 to S05 until the lamination of all the laminated blocks 5 is completed.

If it is determined in step S05 that the lamination of all the laminated blocks 5 is completed, the controller 100 executes steps S06 and S07. In step S06, the lamination control unit 113 controls the blanking device 40 to deliver the laminated body 1A formed by the lamination of the laminated blocks 5 to the conveyor 70A. In step S07, the conveyance control unit 114 controls the conveyor 70A to convey the laminated body 1A from the blanking device 40 to the lamination thickness measurement device 60A. Thus, the lamination procedure ends. The controller 100 repeatedly executes the above processing.

(Before-Annealing Lamination Thickness Check Procedure)

The before-annealing lamination thickness check procedure is a procedure of acquiring the before-annealing lamination thickness information on the thickness of the laminated body 1A before performing the annealing process on the laminated body 1A, checking whether or not the before-annealing lamination thickness information satisfies the before-annealing criterion, and when the before-annealing lamination thickness information satisfies the before-annealing criterion, conveying the laminated body 1A to the annealing device 50. This procedure includes adjusting the lamination condition for the electromagnetic steel plate 4 so that the before-annealing lamination thickness information satisfies the before-annealing criterion when the before-annealing lamination thickness information does not satisfy the before-annealing criterion.

Figure 9:
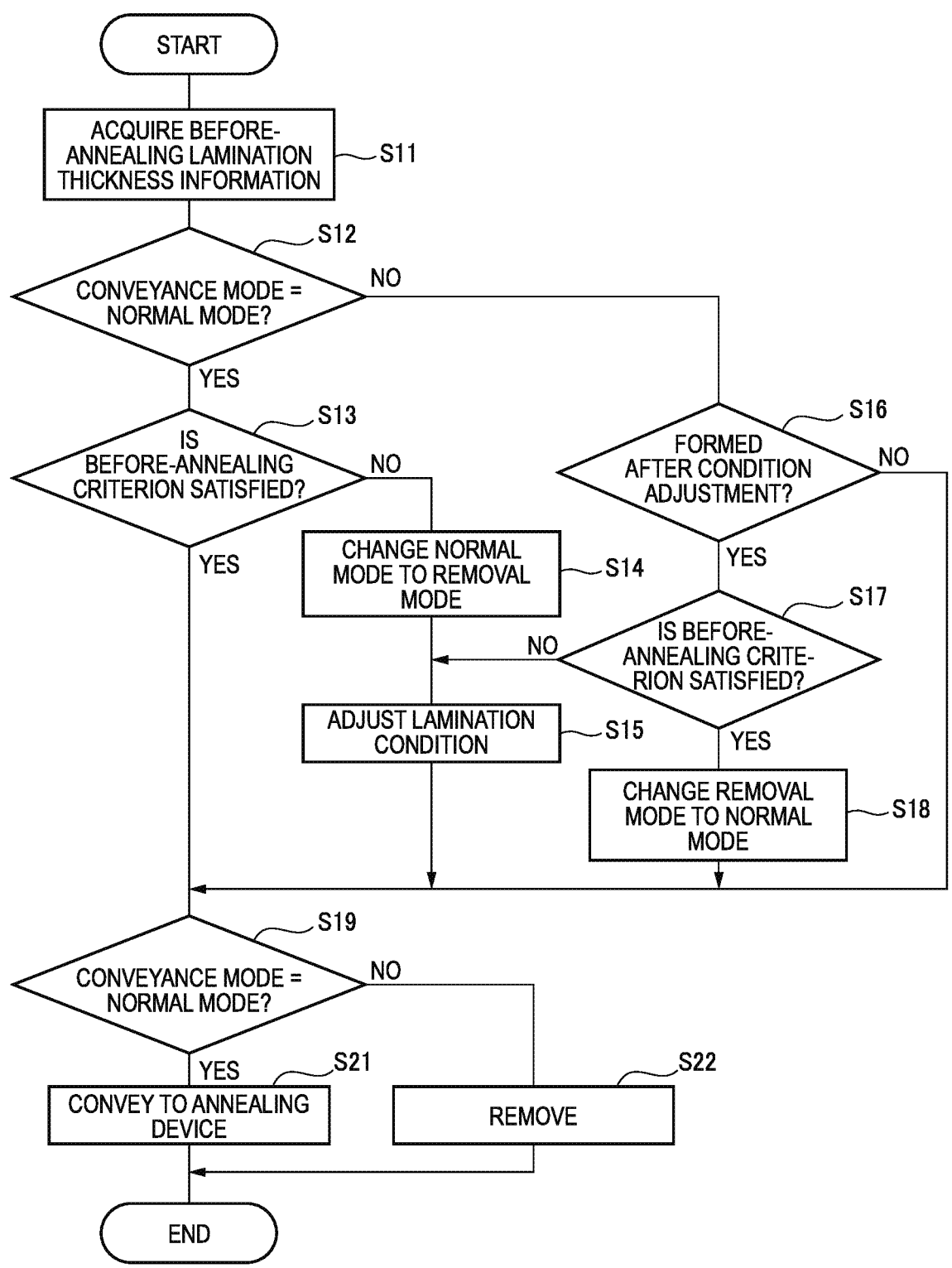
FIG. 9 is a flowchart illustrating a before-annealing lamination thickness check procedure.

For example, as shown in FIG. 9, the controller 100 executes steps S11 and S12. In step S11, the lamination thickness information acquisition unit 115 acquires the before-annealing lamination thickness information of the laminated body 1A from the lamination thickness measurement device 60A. The before-annealing lamination thickness information may include the before-annealing pressed state information and the before-annealing no-load state information. In step S12, the conveyance control unit 117 determines whether or not the conveyance mode stored in the mode holding unit 112 is the normal mode.

If it is determined in step S12 that the conveyance mode is the normal mode, the controller 100 executes step S13. In step S13, the lamination condition adjustment unit 116 checks whether or not the before-annealing lamination thickness information satisfies the before-annealing criterion. For example, the lamination condition adjustment unit 116 checks whether or not the before-annealing pressed state information satisfies the before-annealing pressed state criterion and whether or not the before-annealing no-load state information satisfies the before-annealing no-load state criterion. More specifically, the lamination condition adjustment unit 116 checks whether or not the before-annealing pressed state information is lower than the before-annealing pressed state lower limit value, and whether or not the before-annealing no-load state information is higher than the before-annealing no-load state upper limit value. The lamination condition adjustment unit 116 may further check whether or not the before-annealing pressed state information is higher than the before-annealing pressed state upper limit value.

If it is determined in step S13 that the before-annealing lamination thickness information does not satisfy the before-annealing criterion, the controller 100 executes steps S14 and S15. In step S14, the lamination condition adjustment unit 116 changes the conveyance mode stored in the mode holding unit 112 from the normal mode to the removal mode. In step S15, the lamination condition adjustment unit 116 adjusts the lamination condition for the electromagnetic steel plate 4 so that the before-annealing lamination thickness information satisfies the before-annealing criterion. For example, the lamination condition adjustment unit 116 adjusts the lamination condition so that the before-annealing pressed state information and the before-annealing no-load state information satisfy the before-annealing pressed state criterion and the before-annealing no-load state criterion respectively. More specifically, the lamination condition adjustment unit 116 adjusts the lamination condition so as to increase the thickness of the laminated body 1A when the before-annealing pressed state information is lower than the before-annealing pressed state lower limit value, and adjusts the lamination condition so as to reduce the thickness of the laminated body 1A when the before-annealing no-load state information is higher than the before-annealing no-load state upper limit value. The lamination condition adjustment unit 116 may adjust the lamination condition so as to reduce the thickness of the laminated body 1A even when the before-annealing pressed state information is higher than the before-annealing pressed state upper limit value.

If it is determined in step S12 that the conveyance mode is not the normal mode, the controller 100 executes step S16. In step S16, the lamination condition adjustment unit 116 determines whether or not the laminated body 1A to be measured for the before-annealing lamination thickness information is a laminated body 1A formed after the adjustment of the lamination condition.

If it is determined in step S16 that the laminated body 1A to be measured for the before-annealing lamination thickness information is a laminated body 1A formed after the adjustment of the lamination condition, the controller 100 executes step S17. In step S17, the lamination condition adjustment unit 116 determines whether or not the before-annealing lamination thickness information acquired by the lamination thickness information acquisition unit 115 in step S11 satisfies the before-annealing criterion.

If it is determined in step S17 that the before-annealing lamination thickness information satisfies the before-annealing criterion, the controller 100 executes step S18. In step S18, the lamination condition adjustment unit 116 changes the conveyance mode stored in the mode holding unit 112 from the removal mode to the normal mode.

If it is determined in step S17 that the before-annealing lamination thickness information does not satisfy the before-annealing criterion, the controller 100 shifts the processing to step S15. In this case, the lamination condition adjustment unit 116 executes the adjustment of the lamination condition in step S15 again while maintaining the conveyance mode stored in the mode holding unit 112 in the removal mode.

After executing step S15 or step S18, the controller 100 executes step S19. If it is determined in step S13 that the before-annealing lamination thickness information satisfies the before-annealing criterion, the controller 100 skips steps S14 and S15 and executes step S19. If it is determined in step S16 that the laminated body 1A to be measured for the before-annealing lamination thickness information is not a laminated body 1A formed after the adjustment of the lamination condition, the controller 100 skips steps S17 and S18 and executes step S19. In step S19, the conveyance control unit 117 determines whether or not the conveyance mode stored in the mode holding unit 112 is the normal mode.

If it is determined in step S19 that the conveyance mode is the normal mode, the controller 100 executes step S21. In step S21, the conveyance control unit 117 controls the conveyor 70B to convey the laminated body 1A from the lamination thickness measurement device 60A to the annealing device 50.

If it is determined in step S19 that the conveyance mode is not the normal mode, the controller 100 executes step S22. In step S22, the conveyance control unit 117 controls the conveyor 70B to remove the laminated body 1A using the removing device 710. Thus, the before-annealing lamination thickness check procedure ends. The controller 100 repeatedly executes the above processing.

(Annealing and after-Annealing Lamination Thickness Check Procedure)

The annealing and after-annealing lamination thickness check procedure is a procedure of performing the annealing process on the laminated body 1A, acquiring the after-annealing lamination thickness information on the thickness of the laminated body 1A formed after the annealing process, and checking whether or not the after-annealing lamination thickness information satisfies the after-annealing criterion. This procedure may include adjusting the before-annealing criterion so that the after-annealing lamination thickness information satisfies the after-annealing criterion when the after-annealing lamination thickness information does not satisfy the after-annealing criterion.

Figure 10:
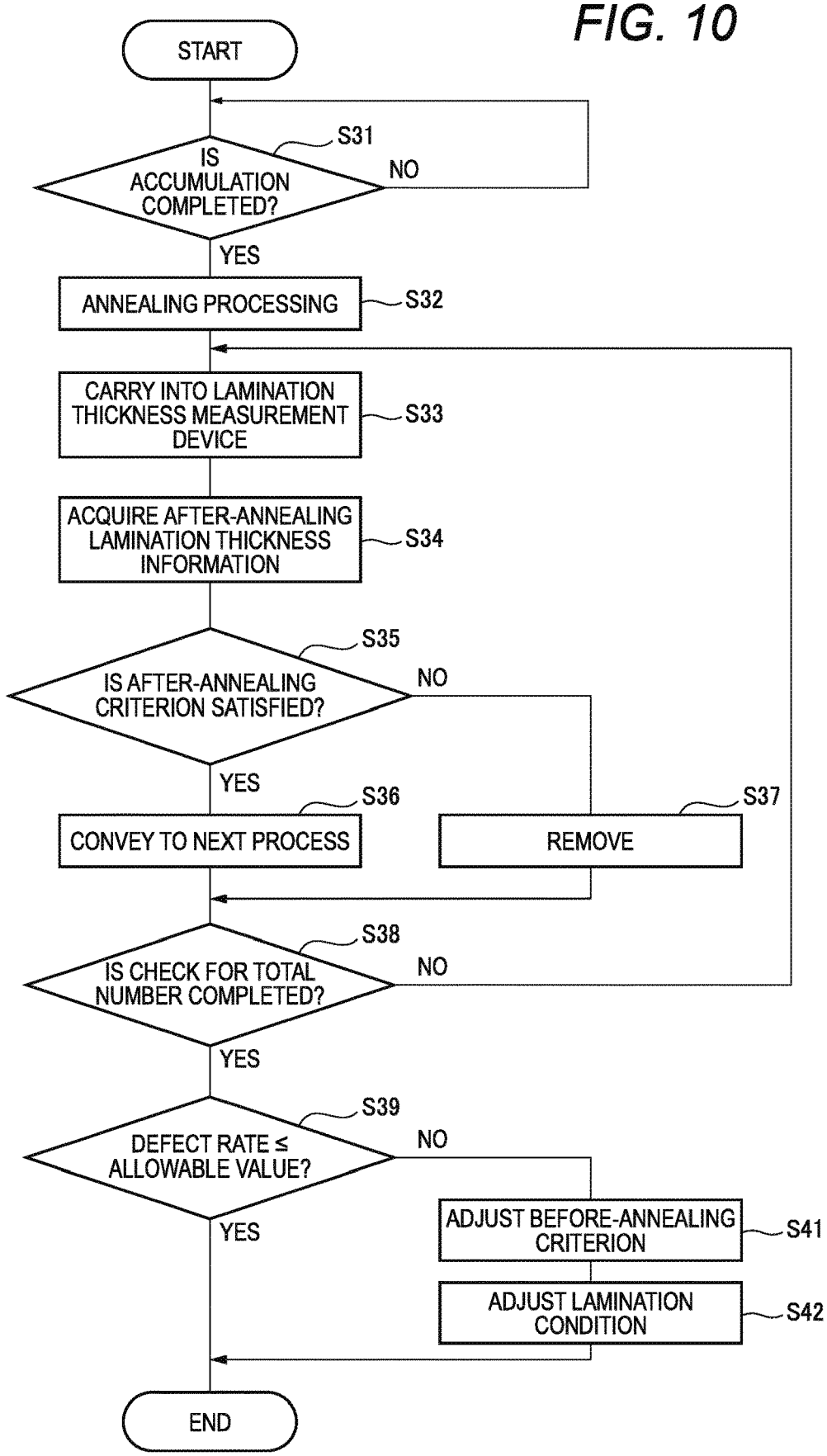
FIG. 10 is a flowchart illustrating an annealing and after-annealing lamination thickness check procedure.

For example, as shown in FIG. 10, the controller 100 executes steps S31 and S32. In step S31, the annealing control unit 118 waits for a predetermined number of laminated bodies 1A to be conveyed from the lamination thickness measurement device 60A to the annealing device 50. In step S32, the annealing control unit 118 controls the annealing device 50 to carry the predetermined number of laminated bodies 1A collectively into an annealing furnace, and to carry the predetermined number of laminated bodies 1A out of the annealing furnace after elapse of a predetermined time period.

Next, the controller 100 executes steps S33, S34, and S35. In step S33, the conveyance control unit 119 controls the conveyor 70C to convey the laminated body 1A from the annealing device 50 to the lamination thickness measurement device 60B. In step S34, the lamination thickness information acquisition unit 121 acquires the after-annealing lamination thickness information of the laminated body 1A from the lamination thickness measurement device 60B. The after-annealing lamination thickness information may include the after-annealing pressed state information and the after-annealing no-load state information. In step S35, the before-annealing criterion adjustment unit 123 checks whether or not the after-annealing lamination thickness information satisfies the after-annealing criterion. For example, the before-annealing criterion adjustment unit 123 checks whether or not the after-annealing no-load state information is higher than the after-annealing no-load state upper limit value.

When it is determined in step S35 that the after-annealing lamination thickness information satisfies the after-annealing criterion, the controller 100 executes step S36. In step S36, the conveyance control unit 124 controls the conveyor 70D to convey the laminated body 1A from the lamination thickness measurement device 60B to a rear-stage device.

If it is determined in step S35 that the after-annealing lamination thickness information does not satisfy the after-annealing criterion, the controller 100 executes step S37. In step S37, the conveyance control unit 124 controls the conveyor 70D to remove the laminated body 1A using the removing device 710.

After executing step S36 or step S37, the controller 100 executes step S38. In step S38, the before-annealing criterion adjustment unit 123 checks whether or not acquisition of the after-annealing lamination thickness information for the total number of the laminated bodies 1A, which are subjected to the annealing process collectively in the annealing device 50, is completed. If it is determined in step S38 that the acquisition of the after-annealing lamination thickness information for the total number of the laminated bodies 1A is not completed, the controller 100 returns the processing to step S33. Thereafter, the controller 100 repeats the processing of steps S33 to S38 until the acquisition of the after-annealing lamination thickness information for the total number of the laminated bodies 1A, which are subjected to the annealing process collectively in the annealing device 50, is completed.

If it is determined in step S38 that the acquisition of the after-annealing lamination thickness information for the total number of the laminated bodies 1A is completed, the controller 100 executes step S39. In step S39, the before-annealing criterion adjustment unit 123 checks whether or not the defect rate is equal to or less than an allowable value.

If it is determined in step S39 that the defect rate exceeds the allowable value, the controller 100 executes steps S41 and S42. In step S41, the before-annealing criterion adjustment unit 123 adjusts the before-annealing criterion so that the after-annealing lamination thickness information satisfies the after-annealing criterion. For example, the before-annealing criterion adjustment unit 123 reduces the before-annealing no-load state upper limit value when the after-annealing no-load state information is higher than the after-annealing no-load state upper limit value. The before-annealing criterion adjustment unit 123 may adjust the before-annealing criterion so as to make the defect rate equal to or less than the allowable value. In step S42, the lamination condition adjustment unit 122 adjusts the lamination condition so that the after-annealing lamination thickness information satisfies the after-annealing criterion. For example, the lamination condition adjustment unit 122 adjusts the lamination condition so as to reduce the thickness of the laminated body 1A when the after-annealing no-load state information is higher than the after-annealing no-load state upper limit value. When it is determined in step S39 that the defect rate is equal to or less than the allowable value, the controller 100 skips steps S41 and S42. Thus, the annealing and after-annealing lamination thickness check procedure ends. The controller 100 repeatedly executes the above processing.

Effect of the Present Embodiment

As described above, the method for manufacturing the laminated body 1A includes laminating the electromagnetic steel plates 4 to form the laminated body 1A, performing the annealing process on the laminated body 1A, acquiring the before-annealing lamination thickness information on the thickness of the laminated body 1A before performing the annealing process on the laminated body 1A, and when the before-annealing lamination thickness information does not satisfy the before-annealing criterion set in advance, adjusting the lamination condition for the electromagnetic steel plate 4 so that the before-annealing lamination thickness information satisfies the before-annealing criterion.

There is a certain degree of correlation between a before-annealing thickness and an after-annealing thickness of the laminated body 1A. Therefore, a defect rate of the thickness after annealing can be reduced by adjusting the thickness before annealing. Accordingly, the manufacturing method is effective in reducing the defect rate of the thickness after annealing of the laminated body 1A of the electromagnetic steel plates 4, which includes adjusting the lamination condition for the electromagnetic steel plate 4 so that the before-annealing lamination thickness information satisfies the before-annealing criterion.

When a defect in the thickness of the laminated body 1A after annealing occurs and the laminated body 1A is removed, not only a material of the laminated body 1A is wasted, but also thermal energy required for annealing the laminated body 1A is wasted. When the annealing process is performed by batch processing in which a plurality of laminated bodies 1A are processed collectively, the above-described waste is even greater. In contrast, by reducing the defect rate of the thickness after annealing of the laminated body 1A, efficiency in manufacturing the laminated body 1A can be improved.

The before-annealing lamination thickness information may include before-annealing pressed state information indicating the thickness of the laminated body 1A in a state where the laminated body 1A is pressed in the laminating direction of the electromagnetic steel plate 4, and before-annealing no-load state information indicating the thickness of the laminated body 1A in a state where the laminated body 1A is not pressed. The before-annealing criterion may include the before-annealing pressed state criterion and the before-annealing no-load criterion which are set in advance. When it falls within at least one of a case where the before-annealing pressed state information does not satisfy the before-annealing pressed state criterion and a case where the before-annealing no-load state information does not satisfy the before-annealing no-load state criterion, the lamination condition may be adjusted so that the before-annealing pressed state information and the before-annealing no-load state information satisfy the before-annealing pressed state criterion and the before-annealing no-load state criterion respectively.

For the laminated body 1A of the electromagnetic steel plate 4, both a thickness of the laminated body 1A in a pressed state and a thickness of the laminated body 1A in a no-load state may be required to be set to a desired state. For example, in order to stabilize performance for serving as an electromagnetic core of an electric motor, the thickness of the laminated body 1A in a pressed state may be required to be within a desired range. In addition, in order to improve the ease of incorporation into the electric motor, it may be required to set the thickness of the laminated body 1A in a no-load state to be within a desired range. On the other hand, by adjusting the lamination condition so that the before-annealing pressed state information and the before-annealing no-load state information satisfy the before-annealing pressed state criterion and the before-annealing no-load state criterion respectively, defect rates of both a thickness of the laminated body 1A in a pressed state after annealing and a thickness of the laminated body 1A in a no-load state after annealing can be reduced.

The before-annealing pressed state criterion may include the before-annealing pressed state lower limit value set in advance, and the before-annealing no-load state criterion may include the before-annealing no-load state upper limit value set in advance. The lamination condition may be adjusted so as to increase the thickness of the laminated body 1A when the before-annealing pressed state information is lower than the before-annealing pressed state lower limit value, and the lamination condition may be adjusted so as to reduce the thickness of the laminated body 1A when the before-annealing no-load state information is higher than the before-annealing no-load state upper limit value. In this case, the thickness of the laminated body 1A in a pressed state after annealing is prevented from being too small. Accordingly, the performance for serving as an electric motor of an electromagnetic core can be improved. Further, the thickness of the laminated body 1A in a no-load state after annealing is prevented from being excessively large. Accordingly, the ease of incorporation into the electric motor can be improved.

The before-annealing pressed state criterion may include the before-annealing pressed state upper limit value set in advance, and the lamination condition may be adjusted so as to reduce the thickness of the laminated body 1A even when the before-annealing pressed state information is higher than the before-annealing pressed state upper limit value. In this case, the performance for serving as an electric motor of an electromagnetic core can be further stabilized.

The method for manufacturing the laminated body 1A may further include acquiring the after-annealing lamination thickness information on the thickness of the laminated body 1A after performing the annealing process on the laminated body 1A, and when the after-annealing lamination thickness information does not satisfy the after-annealing criterion, adjusting the before-annealing criterion so that the after-annealing lamination thickness information satisfies the after-annealing criterion. The after-annealing lamination thickness information may include the after-annealing no-load state information indicating the thickness of the laminated body 1A in a state of not being pressed, and the after-annealing criterion may include the after-annealing no-load state upper limit value set in advance. When the after-annealing no-load state information is higher than the after-annealing no-load state upper limit value, the before-annealing no-load state upper limit value may be reduced. In this case, the defect rate of the thickness after annealing of the laminated body 1A can be further reduced by adjusting the before-annealing no-load state upper limit value in accordance with actual performance of the after-annealing no-load state information.

The method for manufacturing the laminated body 1A may further include adjusting the lamination condition to reduce the thickness of the laminated body 1A, when the before-annealing no-load state information of the laminated body 1A is equal to or lower than the before-annealing no-load state upper limit value and the after-annealing no-load state information of the laminated body 1A is higher than the after-annealing no-load state upper limit value. In this case, the defect rate of the thickness after annealing of the laminated body 1A can be further reduced by reflecting the after-annealing no-load state information in the lamination condition in preference to the before-annealing no-load state information.

The method for manufacturing the laminated body 1A may further include acquiring the after-annealing lamination thickness information on the thickness of the laminated body 1A after the annealing process is performed on the laminated body 1A, and when the after-annealing lamination thickness information does not satisfy the after-annealing criterion set in advance, adjusting the before-annealing criterion so that the after-annealing lamination thickness information satisfies the after-annealing criterion. In this case, the defect rate of the thickness after annealing of the laminated body 1A can be further reduced by adjusting the before-annealing criterion in accordance with the actual performance of the after-annealing no-load state information.

The method for manufacturing the laminated body 1A may further include adjusting the lamination condition, when the before-annealing lamination thickness information of the laminated body 1A satisfies the before-annealing criterion and the after-annealing lamination thickness information of the laminated body 1A does not satisfy the after-annealing criterion, so that the after-annealing lamination thickness information satisfies the after-annealing criterion. In this case, the defect rate of the thickness after annealing of the laminated body 1A can be further reduced by reflecting the after-annealing no-load state information in the lamination condition in preference to the before-annealing no-load state information.

Although an embodiment is described above, the invention is not limited to the embodiment described above, and various modifications can be made without departing from the spirit of the invention.

This application is based on JP2018-093054 filed on May 14, 2018, the contents of which are incorporated herein by reference.

INDUSTRIAL APPLICABILITY

The method for manufacturing a laminated body according to the present disclosure is effective for reducing a defect rate of a thickness after annealing of a laminated body of electromagnetic steel plates.

REFERENCE SIGNS LIST

1A: laminated body
4: electromagnetic steel plate

The invention claimed is:

1. A method for manufacturing a laminated body, comprising:
   repeatedly laminating electromagnetic steel plates to form a laminated body under a predetermined lamination condition;
   performing an annealing process on the laminated body;
   acquiring a before-annealing lamination thickness information on a thickness of the laminated body before performing the annealing process on the laminated body; and
   in an occurrence that the before-annealing lamination thickness information of the laminated body does not satisfy a before-annealing criterion which is predetermined, changing a lamination condition of a following laminated body formed subsequent to the laminated body such that a before-annealing lamination thickness information of the following laminated body satisfies the before-annealing criterion, wherein
   the before-annealing criterion that is predetermined is set in advance based on a relationship between before-annealing lamination thickness information and after-annealing lamination thickness information for previous laminated bodies that correspond to specified thicknesses of the previous laminated bodies before and after annealing that are acquired previously, and wherein
   the following laminated body is formed by repeatedly laminating electromagnetic steel plates of the following laminated body.

2. The method for manufacturing a laminated body according to claim 1, further comprising: in the occurrence that the before-annealing lamination thickness information of the laminated body does not satisfy the before-annealing criterion which is predetermined, a conveyance mode for conveying the laminate body is changed from a normal mode to a removal mode so as to remove the laminated body.

3. A method for manufacturing a laminated body, comprising:
   repeatedly laminating electromagnetic steel plates to form a laminated body under a predetermined lamination condition;
   performing an annealing process on the laminated body;
   acquiring a before-annealing lamination thickness information on a thickness of the laminated body before performing the annealing process on the laminated body; and
   in an occurrence that the before-annealing lamination thickness information of the laminated body does not satisfy a before-annealing criterion which is predetermined, changing a lamination condition of a following laminated body formed subsequent to the laminated body such that a before-annealing lamination thickness information of the following laminated body satisfies the before-annealing criterion, wherein the following laminated body is formed by repeatedly laminating electromagnetic steel plates of the following laminated body, wherein the before-annealing lamination thickness information includes a before-annealing pressed state information of indicating the thickness of the laminated body in a state where the laminated body is pressed in a laminating direction of the electromagnetic steel plates, and a before-annealing no-load state information of indicating the thickness of the laminated body in a state where the laminated body is not pressed, wherein the before-annealing criterion includes a before-annealing pressed state criterion and a before-annealing no-load criterion which are predetermined, and wherein in an occurrence that at least one of a case where the before-annealing pressed state information of the laminated body does not satisfy the before-annealing pressed state criterion and a case where the before-annealing no-load state information of the laminated body does not satisfy a before-annealing no-load state criterion, the lamination condition of the following laminated body is changed such that the before-annealing pressed state information of the following laminated body and the before-annealing no-load state information of the following laminated body satisfy the before-annealing pressed state criterion and the before-annealing no-load state criterion, respectively.

4. The method for manufacturing a laminated body according to claim 3, wherein the before-annealing pressed state criterion includes a before-annealing pressed state lower limit value which is predetermined, and the before-annealing no-load state criterion includes a before-annealing no-load state upper limit value which is predetermined, wherein in an occurrence that the before-annealing pressed state information of the laminated body is lower than the before-annealing pressed state lower limit value, the lamination condition of the following laminated body is changed so as to increase the thickness of the laminated body; and wherein in an occurrence that the before-annealing no-load state information of the laminated body is higher than the before-annealing no-load state upper limit value, the lamination condition of the following laminated body is changed so as to reduce the thickness of the following laminated body.

5. The method for manufacturing a laminated body according to claim 4, wherein the before-annealing pressed state criterion further includes a before-annealing pressed state upper limit value which is predetermined, and wherein even in an occurrence that the before-annealing pressed state information of the laminated body is higher than the before-annealing pressed state upper limit value, the lamination condition of the following laminated body is changed so as to reduce the thickness of the following laminated body.

6. The method for manufacturing a laminated body according to claim 4, further comprising:

acquiring an after-annealing lamination thickness information on the thickness of the laminated body; and in an occurrence that the after-annealing lamination thickness information of the laminated body does not satisfy an after-annealing criterion which is predetermined, changing the before-annealing criterion such that the after-annealing lamination thickness information of the following laminated body satisfies the after-annealing criterion, wherein the after-annealing lamination thickness information includes an after-annealing no-load state information of indicating the thickness of the laminated body in the state where the laminated body is not pressed, wherein the after-annealing criterion includes an after-annealing no-load state upper limit value which is predetermined, and wherein in an occurrence that the after-annealing no-load state information is higher than the after-annealing no-load state upper limit value, the before-annealing no-load state upper limit value is reduced.

7. The method for manufacturing a laminated body according to claim 6, further comprising:

in an occurrence that the before-annealing no-load state information of the laminated body is equal to or lower than the before-annealing no-load state upper limit value, and the after-annealing no-load state information of the laminated body is higher than the after-annealing no-load state upper limit value, changing the lamination condition of the following laminated body so as to reduce the thickness of the laminated body.

8. A method for manufacturing a laminated body, comprising:

repeatedly laminating electromagnetic steel plates to form a laminated body under a predetermined lamination condition;

performing an annealing process on the laminated body;

acquiring a before-annealing lamination thickness information on a thickness of the laminated body before performing the annealing process on the laminated body; and in an occurrence that the before-annealing lamination thickness information of the laminated body does not satisfy a before-annealing criterion which is predetermined, changing a lamination condition of a following laminated body formed subsequent to the laminated body such that a before-annealing lamination thickness information of the following laminated body satisfies the before-annealing criterion, wherein the following laminated body is formed by repeatedly laminating electromagnetic steel plates of the following laminated body, acquiring an after-annealing lamination thickness information on the thickness of the laminated body; and in an occurrence that the after-annealing lamination thickness information does not satisfy an after-annealing criterion which is predetermined, changing the before-annealing criterion such that the after-annealing lamination thickness information of the following laminated body satisfies the after-annealing criterion.

9. The method for manufacturing a laminated body according to claim 8, further comprising:

in an occurrence that the before-annealing lamination thickness information of the laminated body satisfies the before-annealing criterion, and the after-annealing lamination thickness information of the laminated body does not satisfy the after-annealing criterion, changing the lamination condition of the following laminated body such that the after-annealing lamination thickness information of the following laminated body satisfies the after-annealing criterion.

* * * * *